(12) United States Patent
Chaudhari et al.

(10) Patent No.: US 7,437,289 B2
(45) Date of Patent: Oct. 14, 2008

(54) METHODS AND APPARATUS FOR THE SYSTEMATIC ADAPTATION OF CLASSIFICATION SYSTEMS FROM SPARSE ADAPTATION DATA

(75) Inventors: Upendra V. Chaudhari, Elmsford, NY (US); Stephane H. Maes, Danbury, CT (US); Jiri Navratil, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 09/931,316

(22) Filed: Aug. 16, 2001

(65) Prior Publication Data

US 2003/0036904 A1 Feb. 20, 2003

(51) Int. Cl.
*G10L 15/06* (2006.01)
*G10L 15/14* (2006.01)
*G10L 17/00* (2006.01)

(52) U.S. Cl. .................... 704/244; 704/250; 704/256.1
(58) Field of Classification Search ................. 704/236, 704/243, 244, 246, 250, 255, 273, 256.1, 704/256.2, 256.7
See application file for complete search history.

(56) References Cited

U.S. PATENT DOCUMENTS

| | | | | |
|---|---|---|---|---|
| 5,579,436 A | * | 11/1996 | Chou et al. | 704/244 |
| 5,806,029 A | * | 9/1998 | Buhrke et al. | 704/244 |
| 5,960,397 A | * | 9/1999 | Rahim | 704/244 |
| 6,038,528 A | * | 3/2000 | Mammone et al. | 704/203 |
| 6,182,037 B1 | * | 1/2001 | Maes | 704/247 |
| 6,253,179 B1 | * | 6/2001 | Beigi et al. | 704/243 |
| 6,260,013 B1 | * | 7/2001 | Sejnoha | 704/240 |
| 6,330,536 B1 | * | 12/2001 | Parthasarathy et al. | 704/249 |
| 6,411,930 B1 | * | 6/2002 | Burges | 704/240 |
| 6,519,561 B1 | * | 2/2003 | Farrell et al. | 704/232 |
| 6,697,778 B1 | * | 2/2004 | Kuhn et al. | 704/243 |
| 6,738,745 B1 | * | 5/2004 | Navratil et al. | 704/277 |
| 6,751,590 B1 | * | 6/2004 | Chaudhari et al. | 704/246 |
| 6,754,628 B1 | * | 6/2004 | Chaudhari et al. | 704/246 |
| 7,162,641 B1 | * | 1/2007 | Chaudhari et al. | 713/186 |
| 7,318,032 B1 | * | 1/2008 | Chaudhari et al. | 704/254 |
| 2003/0046072 A1 | * | 3/2003 | Ramaswamy et al. | 704/240 |

OTHER PUBLICATIONS

Chaudhari et al., "Very large population text-independent speaker identification using transformation enhanced multi-grained models," Proceedings. ICASSP '01. May 7-11, 2001, vol. 1, pp. 461 to 464.*
K. Fukunaga, "Introduction to Statistical Pattern Recognition", Academic Press, 2nd Edition, 1990, pp. 52 to 53.
U. Chaudhari et al., "Transformation Enhanced Multi-Grained Modeling For Text-Independent Speaker Recognition", Proc. of the International Conference on Spoken Language Processing, Beijing 2000, 4 pages.
C.J. Leggetter et al., "Speaker Adaptation of HMMS Using Linear Regression", Technical Report TR181, Cambridge University Engineering Dept., Cambridge, England, Jun. 1994, pp. 1 to 21.

* cited by examiner

*Primary Examiner*—Martin Lerner
(74) *Attorney, Agent, or Firm*—Ference & Associates LLP

(57) ABSTRACT

Methods and apparatus for the rapid adaptation of classification systems using small amounts of adaptation data. Improvements in classification accuracy are attainable when conditions similar to those that present in adaptation are observed. The attendant methods and apparatus are suitable for a wide variety of different classification schemes, including, e.g., speaker identification and speaker verification.

21 Claims, 2 Drawing Sheets

METHODS AND APPARATUS FOR THE SYSTEMATIC ADAPTATION OF CLASSIFICATION SYSTEMS FROM SPARSE ADAPTATION DATA

FIELD OF THE INVENTION

The present invention relates generally to adaptation in speech verification, speech recognition and speaker recognition.

BACKGROUND OF THE INVENTION

In general, "adaptation" is a process of modifying certain parameters of a previously created (i.e., trained) system using a new set of observation data ("adaptation data") which represent a sample of a class (or classes) known to the system but taken from a presumably different environment, i.e., exhibiting slightly different behavior, as compared to the samples of the same class that were used in the original system training.

Standard adaptation techniques modify the system's "structural" parameters, for example the statistical mean and covariance values (in systems with Gaussian density models), so as to maximize some objective function, e.g., the observation probability or likelihood of the adaptation data, whereby these structural parameters are the same as those estimated in the primary system training. Due to the fact that the number of such parameters may be high in complex systems, an effective adaptation requires a correspondingly large amount of adaptation data in order to achieve robustness of the modified parameters. In view of this, a need has been recognized in connection with undertaking adaptation with smaller amounts of data.

SUMMARY OF THE INVENTION

At least one presently preferred embodiment of the present invention broadly embraces adaptation undertaken with small amounts of adaptation data. Preferably, the adaptation is not carried out on the structural parameters of the system but rather on derived functions, in particular likelihoods and sets of likelihoods generated by the system, whose values are of lower dimension than the dimension of the system parameter space. Thus, a relatively small amount of data may suffice for an effective adaptation.

In summary, one aspect of the present invention provides a method of adapting a classification system, the method comprising the steps of: providing a classification system, the classification system including at least one structural parameter and at least one derived function; and adapting the classification system via adapting the at least one derived function of the classification system.

A further aspect of the present invention provides an apparatus for adapting a classification system, the apparatus comprising: an arrangement for obtaining a classification system, the classification system including at least one structural parameter and at least one derived function; and an arrangement for adapting the classification system via adapting the at least one derived function of the classification system.

Furthermore, an additional aspect of the present invention provides a program storage device readable by machine, tangibly embodying a program of instructions executable by the machine to perform method steps for adapting a classification system, the method comprising the steps of: providing a classification system, the classification system including at least one structural parameter and at least one derived function; and adapting the classification system via adapting the at least one derived function of the classification system.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
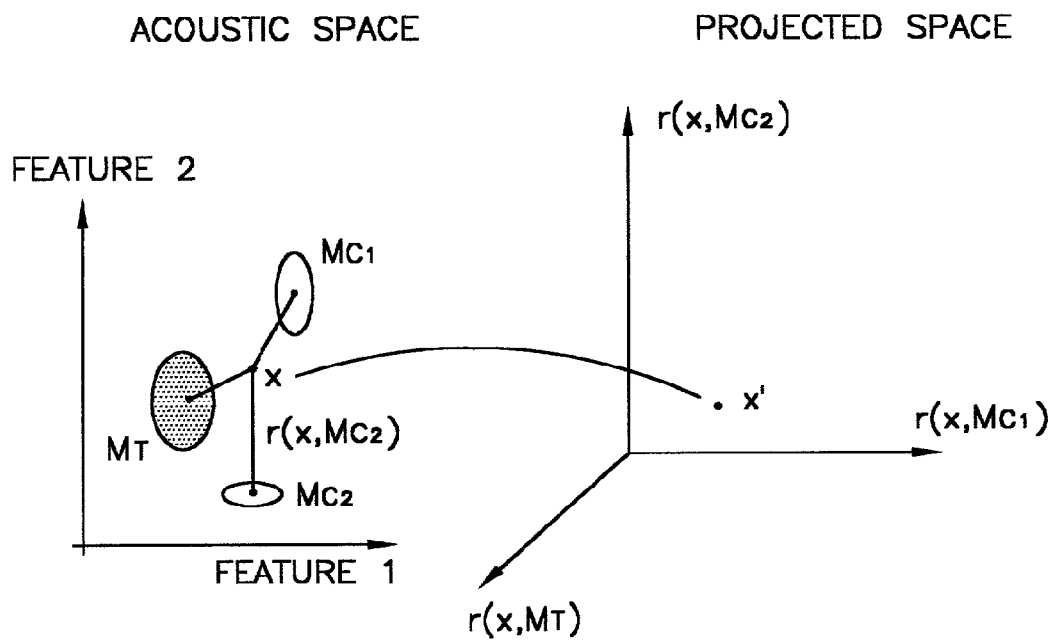
FIG. 1 schematically illustrates an adaptation system.

Throughout the present disclosure, various terms are utilized that are generally well-known to those of ordinary skill in the art. For a more in-depth definition of such terms, any of several sources may be relied upon, including Fukunaga, infra.

A sample method presented herebelow, in accordance with at least one embodiment of the present invention, is carried out on a sample speaker verification system that includes Gaussian Mixture Models (GMM) representing the two following classes: 1) the target speaker, and 2) the "world" (or background) model. However, it should be understood that methods carried out in accordance with at least one embodiment of the present invention may be applicable to essentially any classification problem involving two or more classes, represented by GMMs or by essentially any other suitable model structures.

In the present example, the task of verification is set forth as a binary hypothesis problem involving the two classes mentioned above. Here, $M_T$ and $M_W$ denote the target and the world GMM models, respectively, and $L(X|M)$ represents the likelihood measure for an acoustic utterance X to be generated by a model M. In the present example, L is the generative log-probability density of the model.

To arrive at a verification decision, i.e. to either accept or reject the utterance X as being spoken by the target speaker or not, the likelihood ratio between the target and the world model may typically be calculated as follows (in a manner set forth in K. Fukunaga, "Statistical Pattern Recognition," Academic Press, 2nd Ed., 1990):

$$\Lambda(X) = L(X|M_T) - L(X|M_W), \quad (1)$$

which then serves as basis for the thresholding operation:

$$\text{accept when } \Lambda(X) \geq \vartheta, \text{ otherwise reject}, \quad (2)$$

with $\vartheta$ being the decision threshold that controls the system bias towards more acceptances or more rejections.

Furthermore, the likelihood of the world model can be composed from many individual GMMs; in particular, it can be effectively approximated by a small number of models whose speakers are similar to the target speaker (so-called cohort speakers, or cohorts). Thus, an average likelihood replaces that of the world model in the likelihood ratio (1):

$$\Lambda(X) = L(X|M_T) - \frac{1}{N}\sum_{i=1}^{N} L(X|M_{C_i}) \quad (3)$$

A novel technique in accordance with at least one embodiment of the present invention, and as described herebelow, acts on the level of individual likelihoods L(..) and is, in general, a nonlinear function of the original acoustic feature space (in which X is defined). The adaptation effect is achieved by building new, smaller statistical models that capture the relationship between the individual likelihood variables. The training (system building) procedure may be outlined by the following principal steps, in the particular context of speaker verification:

1. Build the individual models of the verification system (GMM) using standard techniques, e.g. as described in U.V. Chaudhari, J. Navratil, S. Maes, "Transformation enhanced multi-grained modeling for text-independent speaker recognition", Proc. of the International Conference on Spoken Language Processing, Beijing 2000.
2. Define the discriminant function L(X|M), which expresses the closeness of a sample X to a given model M.
3. Using an appropriate algorithm, select a set of K GMMs $S=\{M_1, \ldots, M_K\}$ from the global pool of models, which may or may not include the target model itself. An example of such an algorithm is selecting the target model $M_T$ and its N cohort models $M_{C_1}, \ldots, M_{C_N}$ given a test utterance X, i.e. $S=\{M_T, M_{C_1}, \ldots, M_{C_N}\}$, K=N+1.
4. Define a K-dimensional space in $\mathbb{R}^K$ such that its bases are constituted by functions of the likelihoods on the selected model set, i.e. $\{f[L(X|M_i \in S)]\}_{1 \leq i \leq K}$. An example of function f is the linear function f(x)=x, or also the "rank" function that supplies the ranking position in a sorted list of all available likelihoods.
5. Using adaptation data Y (or alternatively the original training data used in step 1, or any of their combinations) representing the target speaker, create a new parametric model, e.g. a GMM with one or several mixture components, in the space defined in step 4, applying the likelihood measure L on the data Y. Taking the example f(x)=x, the nonlinear projection $\mathbb{R}^D \mapsto \mathbb{R}^K$:$z=\{L(y|M_i)\}_{1 \leq i \leq K}$ transforms a vector y from a D-dimensional acoustic feature space Y to a K-dimensional (projected) feature space Z, where K is the size of the model set S. The modeling step using, for example, one Gaussian component in this space results in obtaining a new model $G=\{\mu, \Sigma|Z\}$ with $\mu$ and $\Sigma$ as the mean and covariance, estimated in the projected space Z.
6. The new discriminant measure of the adapted system can be designed in a variety of ways as a combination of the models in the original space (M) and the new models in the projected space (G). Two examples are given below.

EXAMPLE 1 a) the likelihood ratio $\Lambda(X)$ eq. (3) is calculated
b) the likelihood of the projected utterance Z on the target model G is calculated $L(Z|G_T)$
c) the final likelihood is calculated as a linear interpolation of the two systems:

$$\alpha\Lambda(X|M_T)+(1-\alpha)L(Z|G_T)$$

Instead of the Gaussian likelihood in b), the negative quadratic distance $-(x-\mu)'\Sigma^{-1}(x-\mu)$ can also be given as an example of an alternative closeness measure (which is a special case of the Gaussian form used to discriminate classes with identical determinants).

EXAMPLE 2

Another combination is possible by employing the model parameters G to normalize the likelihoods L(X|M). Let $L_i$ denote the likelihood of X on a model $M_i$, including the target model, and let L be a vector of these likelihoods for X. Then the normalized likelihood ratio can be expressed as follows $$\Lambda(X)=(L-\mu)'\Sigma^{-1}w \quad (4)$$

with w being a vector of appropriate weights (and with the "prime" denoting transposition). Clearly, eq. (4) includes the standard likelihood ratio (3) as a special case, in which $\mu$=0, $\Sigma$=I, and w contains −1 for all cohort models, and 1 for the target model. In connection with the estimated $\mu$, $\Sigma$, the weights in w are preferably designed according U.S. patent application Ser. No. 09/592,310, filed on Jun. 13, 2000, and entitled "Weight Based Background Discriminant Functions in Authentication Systems."

A schematic outline of an adaptation system is shown in FIG. 1. As shown, the adapted system preferably includes the original acoustic classification (verification) models and is enhanced by a number of models created in the projected space. The overall discriminant measure L of the adapted system is calculated either as a combination of all discriminant measures of the available models, as shown in examples above, or as the maximum of all such pairwise combinations.

Figure 2:
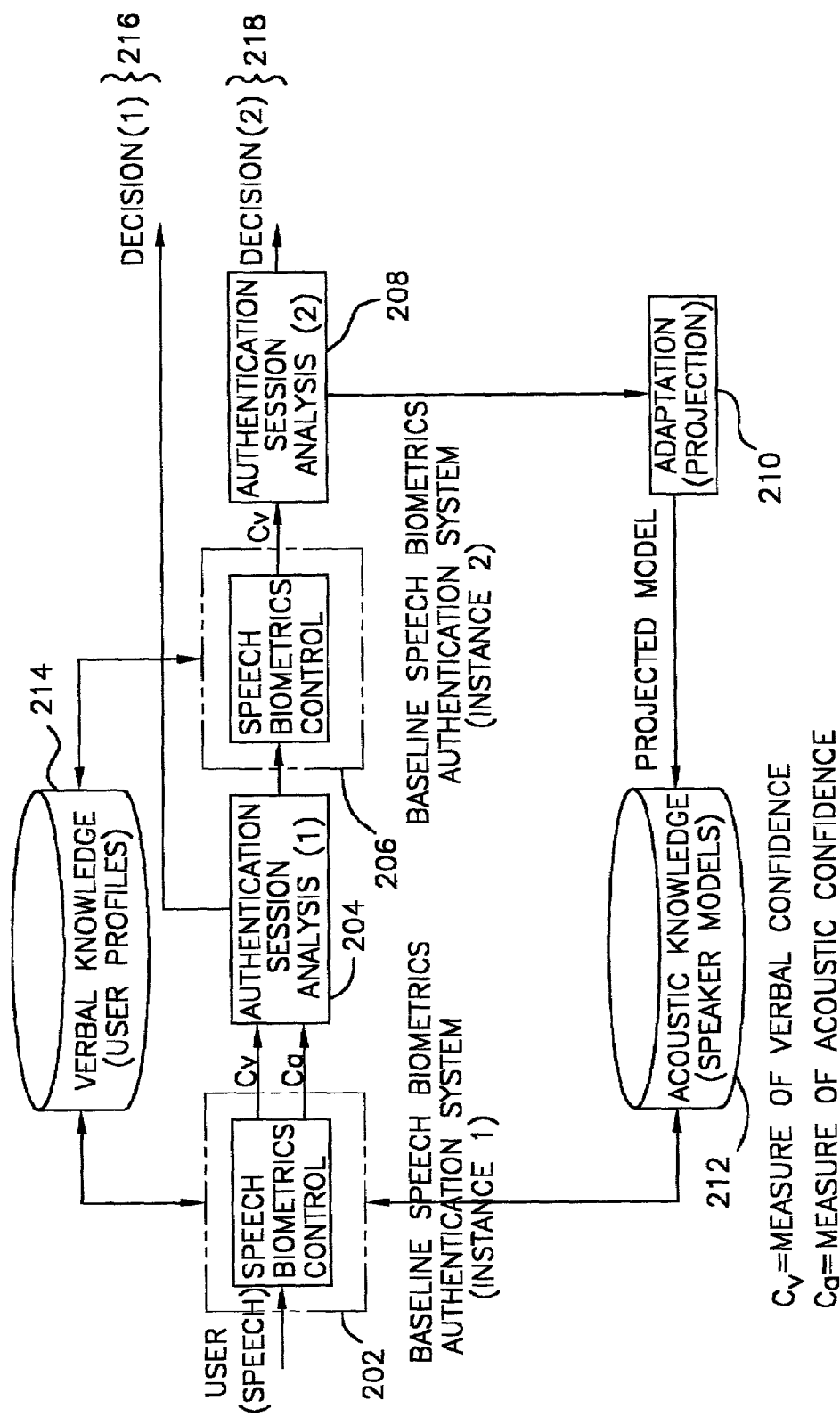
FIG. 2 schematically illustrates a continuous adaptation process.

Using the adaptation scheme described above, a system can preferably be designed so as to continuously and systematically adapt the model inventory to new (previously unseen) acoustic conditions via either (a) supervised or (b) unsupervised updates, based on very small samples. A continuous adaptation scheme is schematically illustrated in FIG. 2.

"Supervised adaptation" implies an externally initiated creation of a new projected model whenever a new condition is detected. However, in the context of conversational speech biometrics, as described in two U.S. Pat. Nos. 5,897,616 and 6,161,090 to S. Maes, D. Kanevsky, both entitled "Apparatus and methods for speaker verification/identification/classification employing non-acoustic and/or acoustic models and databases", i.e., when voice-based authentication is combined with a verbal authentication, a reliable (quasi) supervised adaptation is possible via the following steps:

1. At 202, automatically detect a new acoustic environment using an acoustic confidence measure, e.g. the log-likelihood ratio (eq. (1)) and a preset threshold. In accordance with FIG. 2, this is accomplished using the acoustic confidence measure Ca. In a first authentication session analysis at 204, if Ca is greater than the threshold, then decision (1) is rendered at 216 and the process terminates; otherwise, the process continues with step 2 described below.
2. At 206, open an additional verbal verification interview with an existing speech biometrics session to maintain a required security level (this step corresponds to "backing off" to the verbal authentication modus).
3. As determined in a second authentication session analysis at 208 if the preset security level (Cv) from the previous step is satisfied, the claimed identity of the speaker can be assumed to be correct and the new speech samples from the new environment can be used at 210 to create a projected model for inclusion in a general body of "acoustic knowledge" (i.e., speaker models) at 212, as described heretofore. The system output in this case will then be represented by "decision (2)" at 218. Whenever this particular acoustic environment re-occurs, the adapted system will be able to achieve better accuracy.

4. If, at 208, the preset security level in step 2 is not satisfied, the speaker is either rejected (no adaptation) or the processing is forwarded to a human operator who may have more information to better determine the authenticity (i.e., later adaptation is possible).

It should be understood that the various embodiments set forth and covered heretofore can be extendible to a general N-class classification problem in a straightforward manner. By keeping the background model set $S=\{M_{C_1}, \ldots, M_{C_K}\}$ of the size K, common for all relevant N classes, the projection onto z: $\mathbb{R}^D \mapsto \mathbb{R}^K$: $z=\{L(y|M_i)\}_{1 \leq i \leq K}$ can be made for each individual class. All other considerations, such as the way of combining the original and the projected model, remain valid.

In recapitulation, among the significant advantages of methods and arrangements according to at least one presently preferred embodiment of the present invention is the ability to create small projected models using very small numbers of adaptation data. In practice, one second or a few seconds of speech may provide enough information for an effective adaptation model. This is due to the fact that the projection bases are likelihood (or other closeness) measures calculated on the basis of more complex models, such as Gaussian Mixture Models created using large amounts of training data. Given this advantage, the method can be favorably used in the context of speech biometrics, in which case the verbal part of the authentication is used to maintain security while the acoustic part of the system is being updated/adapted to the new acoustic condition. The number of parameters of the projected model depends on the number of bases (or cohort speakers) and is typically smaller than the parameter number of other adaptation methods, such as Maximum Likelihood Linear Regression (see C. J. Leggetter, P. C. Woodland, "Speaker adaptation of HMMs using linear regression," Technical Report TR 181, Cambridge University Engineering Dept., Cambridge, England). However, since the level on which the adaptation occurs in the new technique is different from that of other techniques, the latter can also be combined with any other standard adaptation acting on either the feature space or the model parameters.

It is to be understood that the present invention, in accordance with at least one presently preferred embodiment, includes an arrangement for obtaining a classification system and an arrangement for adapting a classification system, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of adapting a speech classification system, said method comprising the steps of:
   providing an input corresponding to speech to the speech classification system, the speech classification system including at least one structural parameter and at least one derived function, wherein the speech classification system utilizes Gaussian mixture models that represent both a target model and a global model;
   adapting the speech classification system via adapting the at least one derived function of the classification system; and
   selecting a model set from the global model set that includes more than one Gaussian mixture model;
   wherein the adaptation utilizes a multidimensional space that is based upon the selected model set;
   wherein the speech classification system provides a classification output decision.

2. The method according to claim 1, further comprising the steps of:
   providing a set of trained data; and
   obtaining a set of observation data.

3. The method according to claim 1, wherein the at least one derived function of the classification system comprises at least one of: likelihoods and sets of likelihoods.

4. The method according to claim 1, wherein said step of providing a speech classification system comprises providing a classification system configured for providing speaker verification.

5. The method according to claim 4, wherein the at least one derived function of the speech classification system comprises at least one likelihood measure representing the likelihood of an acoustic utterance to be generated by a model.

6. The method according to claim 1, wherein said adapting step comprises continuously adapting the speech classification system.

7. The method according to claim 6, wherein said step of providing a speech classification system comprises providing a classification system configured for providing speaker verification.

8. The method according to claim 7, wherein said adapting step comprises continuously adapting the speech classification system to new acoustic conditions.

9. The method according to claim 8, wherein said step of continuously adapting the speech classification system comprises automatically detecting a new acoustic environment.

10. The method according to claim 8, wherein the step of continuously adapting the speech classification system comprises satisfying a preset security level in verifying the claimed identity of a speaker.

11. An apparatus for adapting a speech classification system, said apparatus comprising:
    an arrangement for obtaining an input corresponding to speech and providing the input to the speech classification system, the speech classification system including at least one structural parameter and at least one derived function;
    an arrangement for utilizing Gaussian mixture models that represent both a target model and a global model;
    an arrangement for adapting the speech classification system via adapting the at least one derived function of the classification system; and
    an arrangement for selecting a model set from the global model set that includes more than one Gaussian mixture model;
    an arrangement for wherein the adaptation utilizes a multidimensional space that is based upon the selected model set;
    wherein the speech classification system provides a classification output decision.

12. The apparatus according to claim 11, further comprising:
an arrangement for obtaining a set of trained data; and
an arrangement for obtaining a set of observation data.

13. The apparatus according to claim 11, wherein the at least one derived function of the speech classification system comprises at least one of: likelihoods and sets of likelihoods.

14. The apparatus according to claim 11, wherein said speech classification system comprises providing a classification system configured for providing speaker verification.

15. The apparatus according to claim 14, wherein the at least one derived function of the speech classification system comprises at least one likelihood measure representing the likelihood of an acoustic utterance to be generated by a model.

16. The apparatus according to claim 11, wherein said adapting arrangement is configured for continuously adapting the speech classification system.

17. The apparatus according to claim 16, wherein said speech classification system is configured for providing speaker verification.

18. The apparatus according to claim 17, wherein said adapting arrangement is configured for continuously adapting the speech classification system to new acoustic conditions.

19. The apparatus according to claim 18, wherein said adapting arrangement is configured for automatically detecting a new acoustic environment in continuously adapting the speech classification system to new acoustic conditions.

20. The apparatus according to claim 18, wherein said adapting arrangement is configured for satisfying a preset security level in verifying the claimed identity of a speaker in continuously adapting the speech classification system to new acoustic conditions.

21. A program storage device readable by machine, tangibly embodying a program of instructions executable by the machine to perform method steps for adapting a classification system, said method comprising the steps of:
providing an input corresponding to speech to the speech classification system, the speech classification system including at least one structural parameter and at least one derived function, wherein the speech classification system utilizes Gaussian mixture models that represent both a target model and a global model;
adapting the classification system via adapting the at least one derived function of the classification system; and
selecting a model set from the global model set that includes more than one Gaussian mixture model;
wherein the adaptation utilizes a multidimensional space that is based upon the selected model set;
wherein the speech classification system provides a classification output decision.

* * * * *